United States Patent
Goor et al.

(10) Patent No.: US 6,386,632 B1
(45) Date of Patent: May 14, 2002

(54) CONVERTIBLE CHILD SAFETY SEAT

(75) Inventors: Dan Goor; David F. Clement; E. Patricia Goor, all of Colorado Springs, CO (US)

(73) Assignee: XSCI, Inc., Colorado Springs, CO (US)

( * ) Notice: Subject to any disclaimer, the term of this patent is extended or adjusted under 35 U.S.C. 154(b) by 0 days.

(21) Appl. No.: 09/515,434

(22) Filed: Feb. 29, 2000

Related U.S. Application Data (63) Continuation-in-part of application No. 09/170,383, filed on Oct. 13, 1998, now Pat. No. 6,042,181.
(60) Provisional application No. 60/065,818, filed on Nov. 14, 1997, and provisional application No. 60/061,889, filed on Oct. 14, 1997.

(51) Int. Cl.[7] .................................................. B60N 2/28
(52) U.S. Cl. .............................. 297/216.11; 297/183.2; 297/256.14; 297/256.16
(58) Field of Search ....................... 297/183.2, 216.11, 297/250.1, 256.16, 256.14

(56) References Cited

U.S. PATENT DOCUMENTS

| | | | | |
|---|---|---|---|---|
| 4,681,368 A | * | 7/1987 | Heath et al. ............ | 297/216.11 |
| 5,409,292 A | * | 4/1995 | Kain et al. ............ | 297/183.3 X |
| 5,556,162 A | * | 9/1996 | Rattini ............... | 297/216.11 X |
| 5,716,095 A | * | 2/1998 | Lopez ................ | 297/216.11 X |
| 5,733,003 A | * | 3/1998 | Goor ................. | 297/216.11 X |
| 5,884,967 A | * | 3/1999 | Gasper ............... | 297/216.11 |

* cited by examiner

Primary Examiner—Peter R. Brown
(74) Attorney, Agent, or Firm—Weingarten, Schurgin, Gagnebin & Lebovici LLP (57) ABSTRACT

The convertible child safety seat of the present invention provides improved occupant protection in all vehicles, in both the front and rear seats, and especially in vehicles equipped with a passenger-side airbag. The child safety seat includes an air bag deflector, including a shock absorbent canopy to deflect an expanding air bag away from the infant and dampen the shock of airbag deployment and an impact. The child safety seat is convertible from a rearward facing position to a forward facing position. The cradle of the safety seat is removable utilizing a single-handed release mechanism to unlock the cradle from the frame. A handle with ergonomically designed grips aids removal of the cradle and allows carrying the cradle to put less strain on the carrier.

16 Claims, 12 Drawing Sheets

CONVERTIBLE CHILD SAFETY SEAT

CROSS REFERENCE TO RELATED APPLICATIONS

This application claims priority under 35 U.S.C. § 120 and a continuation-in-part to patent application Ser. No. 09/170,383, filed Oct. 13, 1998, entitled: CONVERTIBLE CHILD SAFETY SEAT, now U.S. Pat. No. 6,042,181 which application claimed priority under 35 U.S.C. § 119(e) to provisional patent application Ser. No. 60/061,889 filed Oct. 14, 1997 and provisional patent application Ser. No. 60/065,818 filed Nov. 14, 1997, the disclosures of all of which are hereby incorporated by reference.

STATEMENT REGARDING FEDERALLY SPONSORED RESEARCH OR DEVELOPMENT

N/A

BACKGROUND OF THE INVENTION

Many states have passed laws that mandate the use of a child safety seat for children up to the age of four years old. In recent years, an increasing number of vehicles have been equipped with passenger-side airbags with the expectation that all automobiles produced in the United States will be so equipped, and by 1999, passenger-side airbags will be federally mandated for all new vehicles, including light trucks.

Although child seat manufacturers routinely warn purchasers to secure the child safety seat in the center of the rear-seat when there is an airbag in the car, it is not uncommon for the seat to be placed in the front, passenger-side seat. However, rear-facing infants in the back seat, when alone with the driver, often cause distractions which contribute to or cause crashes. In addition, recent Government data shows that in numerous rear-end crashes, front seats break and hurt, or even kill, children in the back seat. For the sake of safety alone, if not for passenger side airbag, then rearfacing infants should be placed in the front seat to avoid distractions from the back seat which contribute to crashes and to allow for infant driver eye contact thus adding to the infant's feeling of security. That not withstanding, the failure to follow the manufacturer's instructions presents a serious safety risk to an infant in a rearfacing safety seat positioned in front of a passenger side air bag.

A significant body of data has shown that the interaction between a rear facing infant seat and a front passenger-side airbag can result in excessive head and chest acceleration, causing serious and perhaps fatal injury to an infant occupant. For example, the airbag/seat interaction produces accelerations of an infant's head exceeding 100 G's at bag impact and Head Injury Criterion (HIC) values ranging from 650 to 1300. By contrast, rear facing seats not experiencing airbag interaction produce head accelerations of about 50 G's and HIC values less than 1000 and generally around 650 when crash tested at a standardized test speed of 48 km/hr. The Child Restraint Air Bag Interaction (CRABI) task force recommends 390 HIC as the top acceptable number for infant safety. One reason that it has not been possible to meet the HIC recommendations is that current infant restraint systems use hard plastics.

Further research has shown that in some cases there is an interaction between the rear facing infant seat installed in the back seat and a front passenger seat back, particularly when an adult occupies the front seat. In case of a rear collision, the impact causes the front passenger seat to collapse and come in contact with the infant seat, transmitting forces that need to be cushioned. Such forces can be greatly exacerbated by the presence of a passenger in the front passenger seat.

Infants are usually transported in rear facing car seats and in many cases it is desired to remove the cradle of the rear facing car seat to transport the infant to other locations such as a grocery cart, restaurant, etc. Current methods to solve this need have required removing the entire seat as one piece or have required that the cradle first be released from the frame using releases on both sides of the cradle and then the cradle be lifted from the frame. These motions have been awkward for parents.

As part of the cradle, a handle is usually incorporated to facilitate removal of the cradle from the car seat and to provide a convenient way to carry the cradle. Such handles are usually adapted to lift the cradle in only one particular way, rather than being versatile. When transporting the cradle a distance, the handles require the carrier to assume an awkward arm and hand position relative to the center of gravity of the infant.

Infants are usually transported in rear facing car seats, and as the infant grows and becomes larger, they are typically migrated into forward facing car seats. Usually this requires the purchase of a new car seat. Additionally, as the infant grows he or she may outgrow the first forward facing car seat, requiring the purchase of another, larger sized forward facing car seat.

It would therefore be desirable to provide a child safety seat that will protect a child when the safety seat is installed in any seat in a vehicle, which may or may not be equipped with a passenger side airbag, the cradle of which is easily removed from the car seat base, has an ergonomically designed handle and provides a child safety seat that is convertible from a rearward facing position to a forward facing position.

SUMMARY OF THE INVENTION

The present invention improves upon previous attempts to overcome the disadvantages and dangers described above by providing improved occupant protection in all vehicles, with particular enhancement in vehicles equipped with a passenger-side airbag. The child safety seat includes an air bag deflector to deflect an expanding air bag away from the infant and absorb the air bag energy and any impact energy. The air bag deflector further incorporates a shock absorbent crumple zone to further absorb the deceleration and/or shock energies that might harm the child. The child safety cradle is released from the base and deflector using a single-handed release mechanism. This single-handed release allows the parent to release and lift the cradle simultaneously without stretching to access the release mechanism. The release handle is operated from either side of the cradle and incorporates independent child locks. These child locks must be engaged prior to the release mechanism operation. The child locks may be operated independently allowing use from either side of the cradle A fixed or removable handle incorporates hand grips designed to allow the cradle to be lifted straight up and then in a variety of positions and translate the forces exerted by the child's weight ergonomically through the wrist and arm of the carrier, accommodating either left or right handed carriers. The child safety seat is convertible from a rearward facing position, best for infants, to a forward facing position that is better for a child.

DESCRIPTION OF THE DRAWINGS

The invention will be more fully understood by reference to the following detailed description when considered in conjunction with the accompanying drawings, in which.

DETAILED DESCRIPTION OF THE INVENTION

Figure 1:
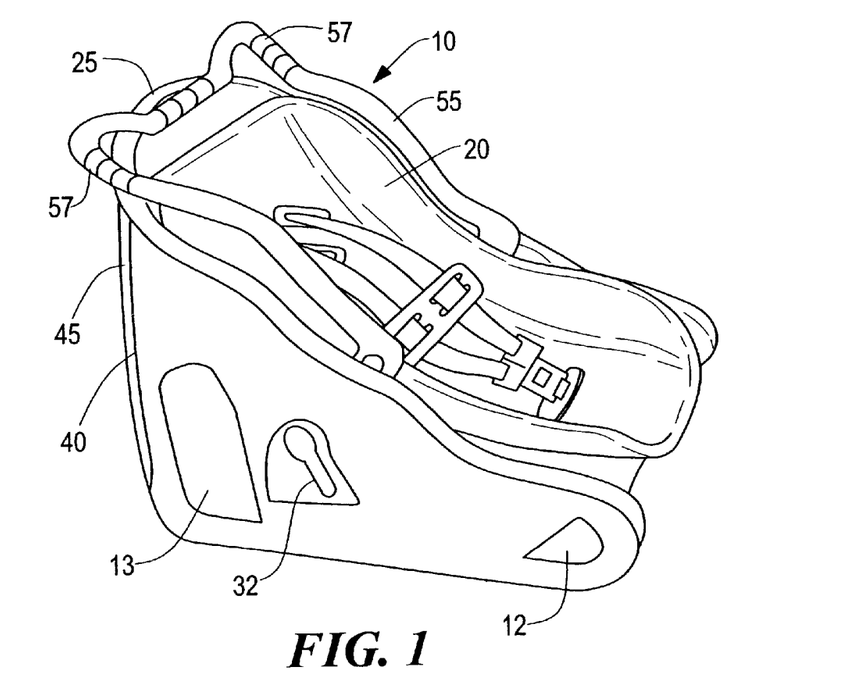
FIG. 1 is a view of the convertible child safety seat of the present invention.
Figure 3:
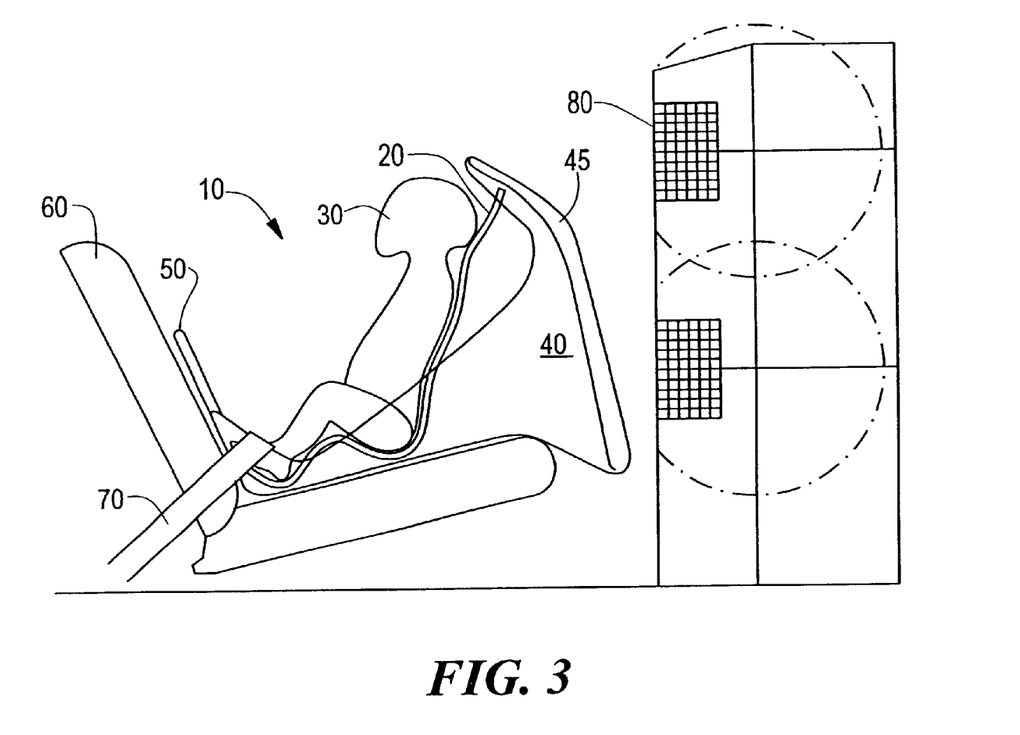
FIG. 3 is a diagrammatic side view of the child safety seat of the present invention in a rearward position installed in the front seat of a vehicle.
Figure 7:
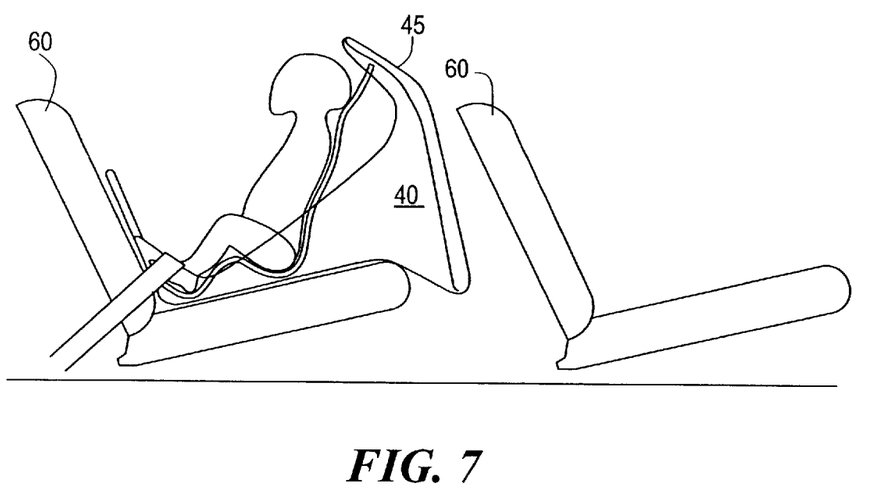
FIG. 7 is a diagrammatic side view of the child safety seat of the present invention in a rearfacing position installed in the rare seat of a vehicle.
Figure 8:
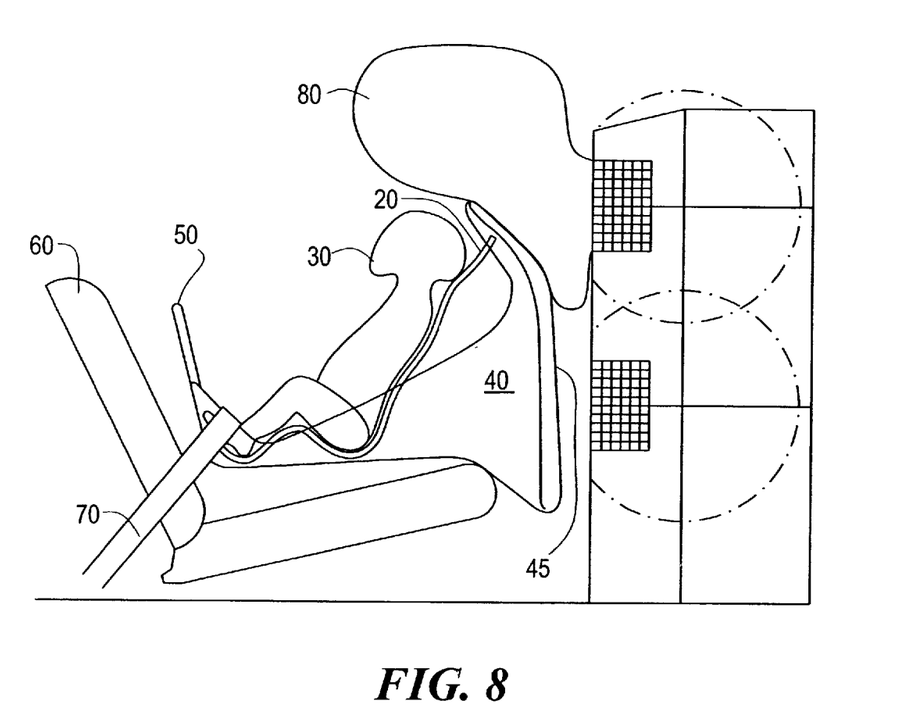
FIG. 8 is a diagrammatic side view of the child safety seat of FIG. 3 with the air bag fully inflated.
Figure 12:
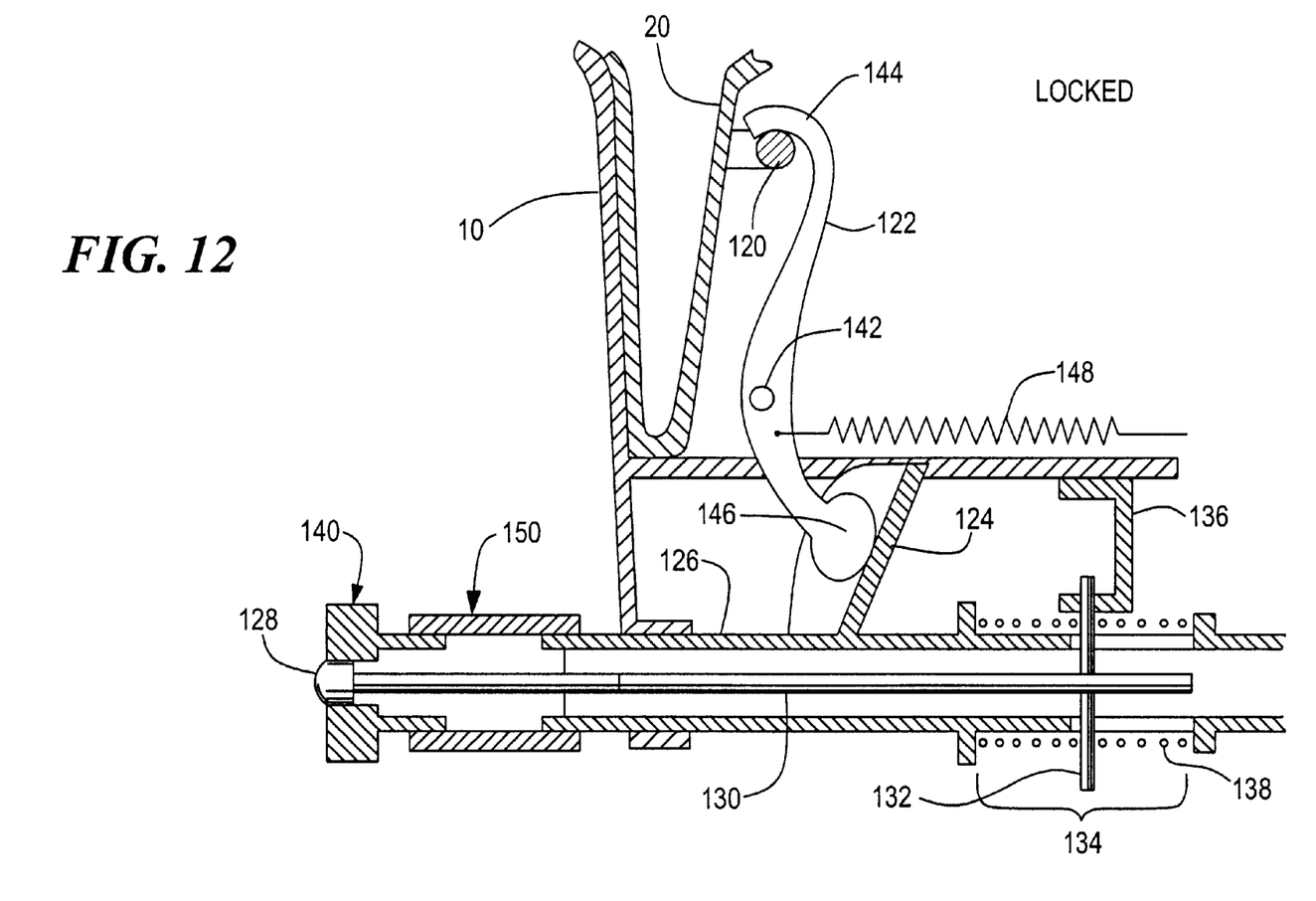
FIG. 12 is a detail side view of a release mechanism locked to hold a child safety seat.
Figure 13:
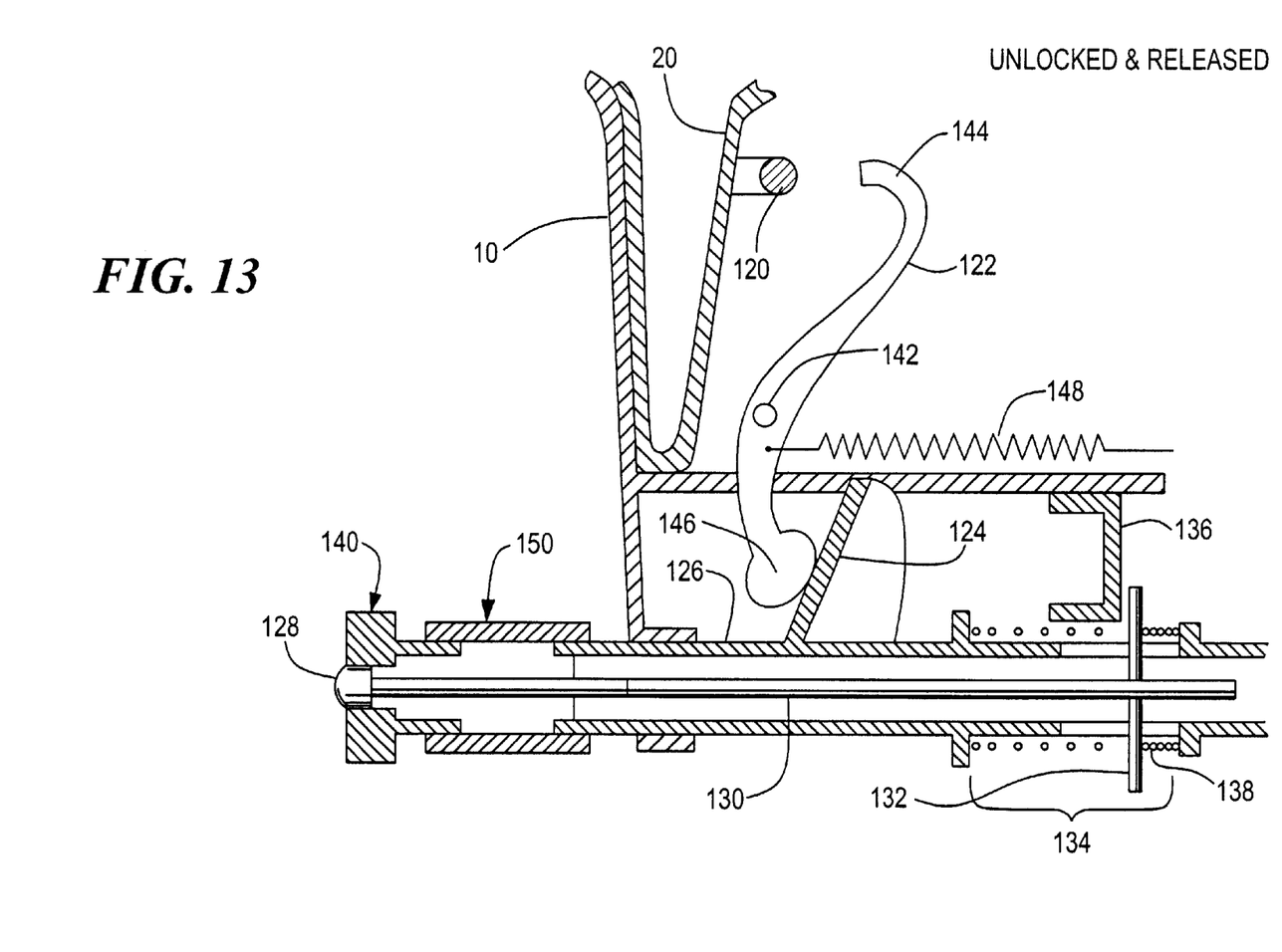
FIG. 13 is a detail side view of a release mechanism released to allow removal of a child safety seat.
Figure 14:
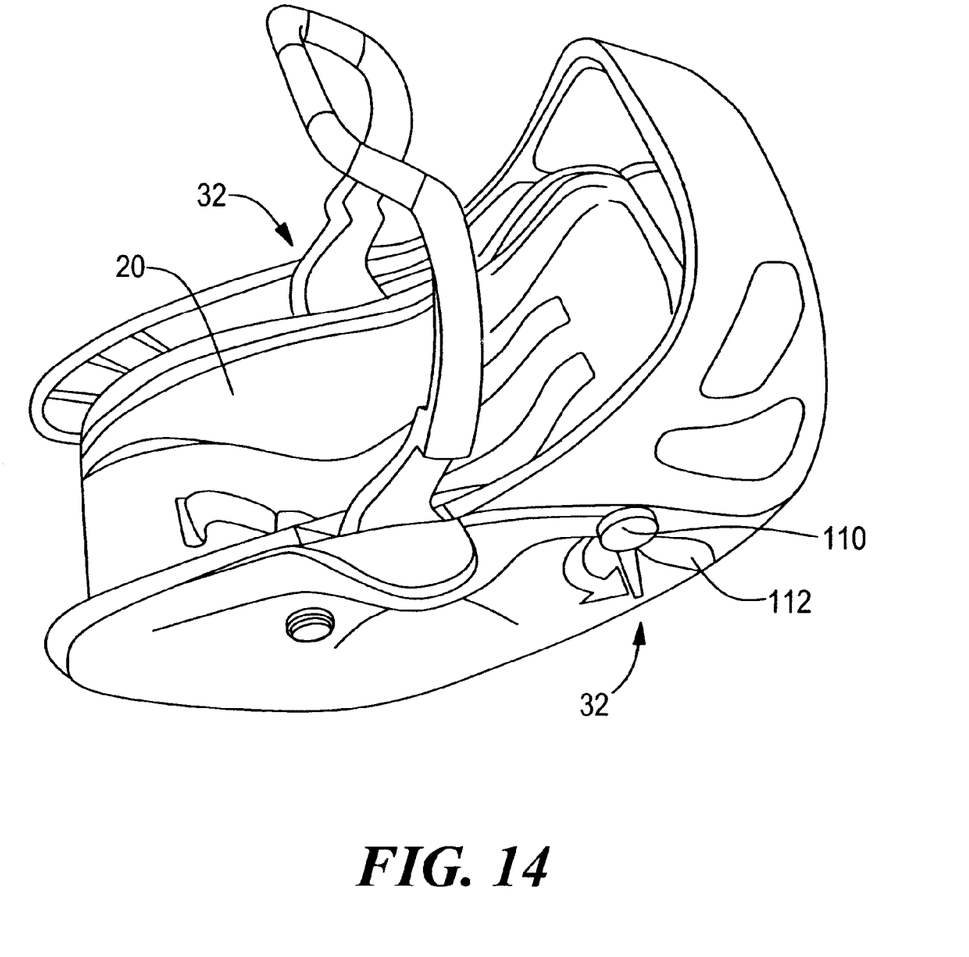
FIG. 14 is a side view of a mechanism for engaging the safety release mechanism using a single hand.
Figure 15:
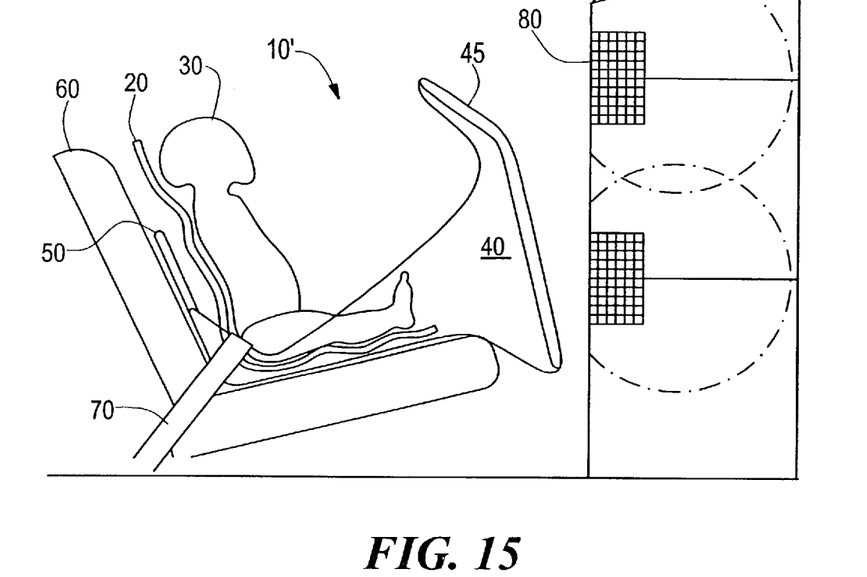
FIG. 15 is a diagrammatic side view of the child safety seat of the present invention in a forward position installed in the front seat of a vehicle.
Figure 16:
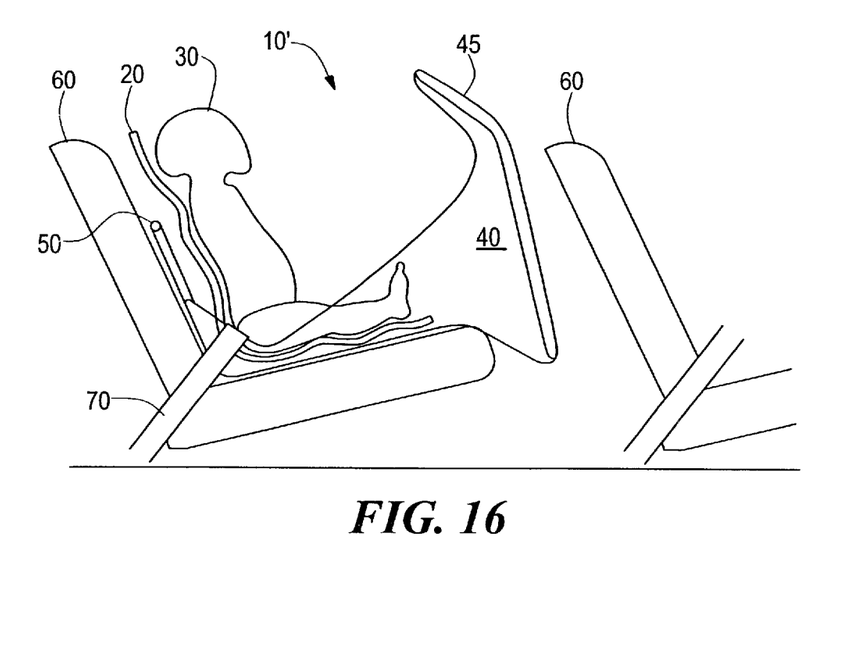
FIG. 16 is a diagrammatic side view of the child safety seat of the present invention in a forward position installed in the rear seat of a vehicle.

A removable infant/child safety seat that can be used with the child facing forward or the infant facing backward incorporates an advanced air bag deflector, improved handle and convenient release mechanism. Referring to FIG. 1, the seat 10 includes a frame 25 having a cradle 20 removably secured thereto. The seat 10 further comprises an airbag deflector 40, incorporating a crumple zone 45 that surrounds and is a part of the frame 25. The air bag deflector may be integrated as part of the frame or may be a separate element, which attaches to and surrounds a portion of the frame. The air bag deflector 40 is operative to deflect an expanding air bag away from an infant seated within the cradle 20 of the seat 10. The crumple zone of the air bag deflector absorbs a majority of the force imparted by the deploying air bag or by contact between the safety seat and part of the car. The air bag deflector/frame 40/25 both absorb and transfer the remainder of the force imparted to the safety seat to the vehicle seat. The removable cradle 20 can be installed within the frame 25 in a first position in which an infant seated within the safety seat would be facing rearward as shown in FIGS. 3, 7 and 8, or in a second position in which the child (one to three years old) 30 seated within the safety seat 10 would be facing forward as shown in FIGS. 14–16. The convertible car seat further includes a one-handed safety release 32 to disengage the cradle from the frame as illustrated in FIGS. 1, and 15–16. The cradle may further include a removable handle 55 with ergonomic integral grips 57 for carrying the cradle detached from the car seat frame as shown in FIGS. 12–14. The convertible car seat may further include an anti-kick bar 50 at the end of the frame 40 furthest from the airbag deflector shown in FIGS. 3, 7, 9, 10 and 11. The seat 10 also includes a front orifice 12 for allowing a seat belt to pass therethrough for securing the safety seat to the automobile passenger seat when the safety seat 10 is used in a rearward facing position, and a rear orifice 13 for allowing a seat belt to pass therethrough for securing the safety seat 10 to the automobile passenger seat when the safety seat 10 is used in a forward facing position.

Figure 2:
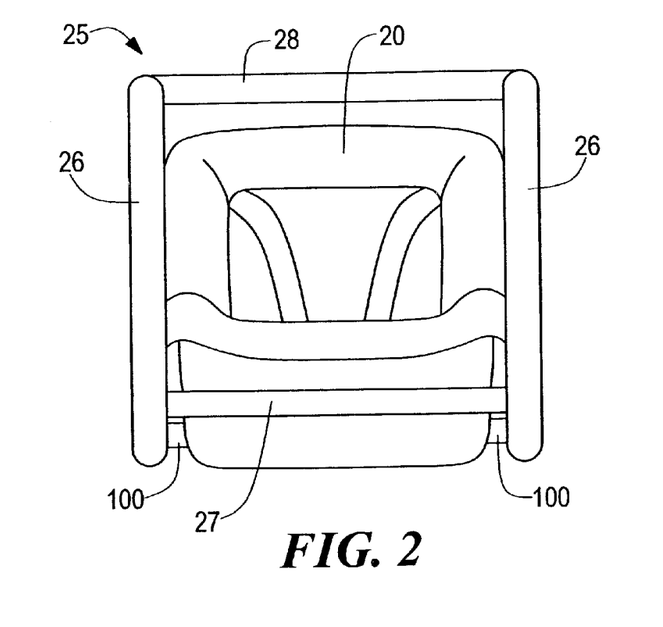
FIG. 2 is a front view of the frame and cradle of the child safety seat of FIG. 1.

Referring now to FIG. 2, a view of the frame and cradle only are presented. The frame 25 in this embodiment is comprised of sidepieces 26 that are generally parallel to each other, a top piece 28 and a bottom piece 27. The top piece 28 and bottom piece 27 mechanically interconnect the sidepieces 26 to each other. While a four piece frame is shown, it should be understood that a unitary frame or a frame comprising any number of pieces could also be utilized. The cradle 20 is mounted to the frame 25 Additionally, while the cradle is shown mounted to the frame, the cradle can be detached from the frame by any mechanisms known in the art. The mounting mechanism can include shock mounting components. It should be understood that any number of shock mounts, absorbent materials or shock mounting configurations including but not directly limited to mounts molded directly to the frame or cradle may be used to mount the cradle to the frame.

A rear facing convertible child seat installed for normal operation of the vehicle is shown in FIG. 3. The convertible child safety seat 10 with handle removed is shown installed in the passenger side front seat 60 of a motor vehicle. A seat belt 70 aids in securing the safety seat 10 to the front seat 60 of the vehicle. In this configuration, the airbag deflector 40 with crumple zone 45 faces the dashboard where airbags 80 are installed.

Figure 4:
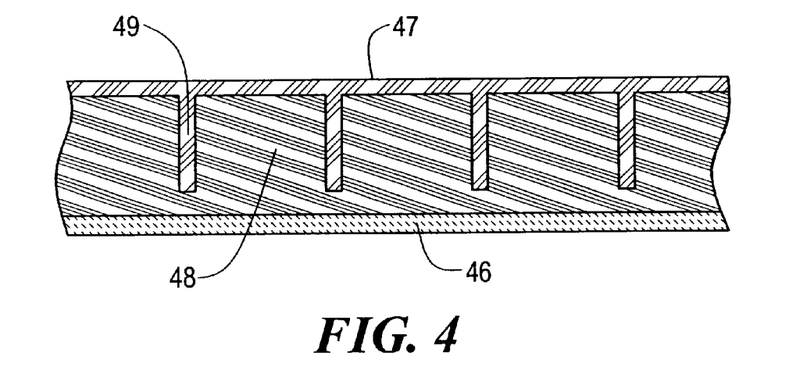
FIG. 4 is a partial cross-sectional view of the shock absorbent crumple zone along line IV—IV of FIG. 5.
Figure 5:
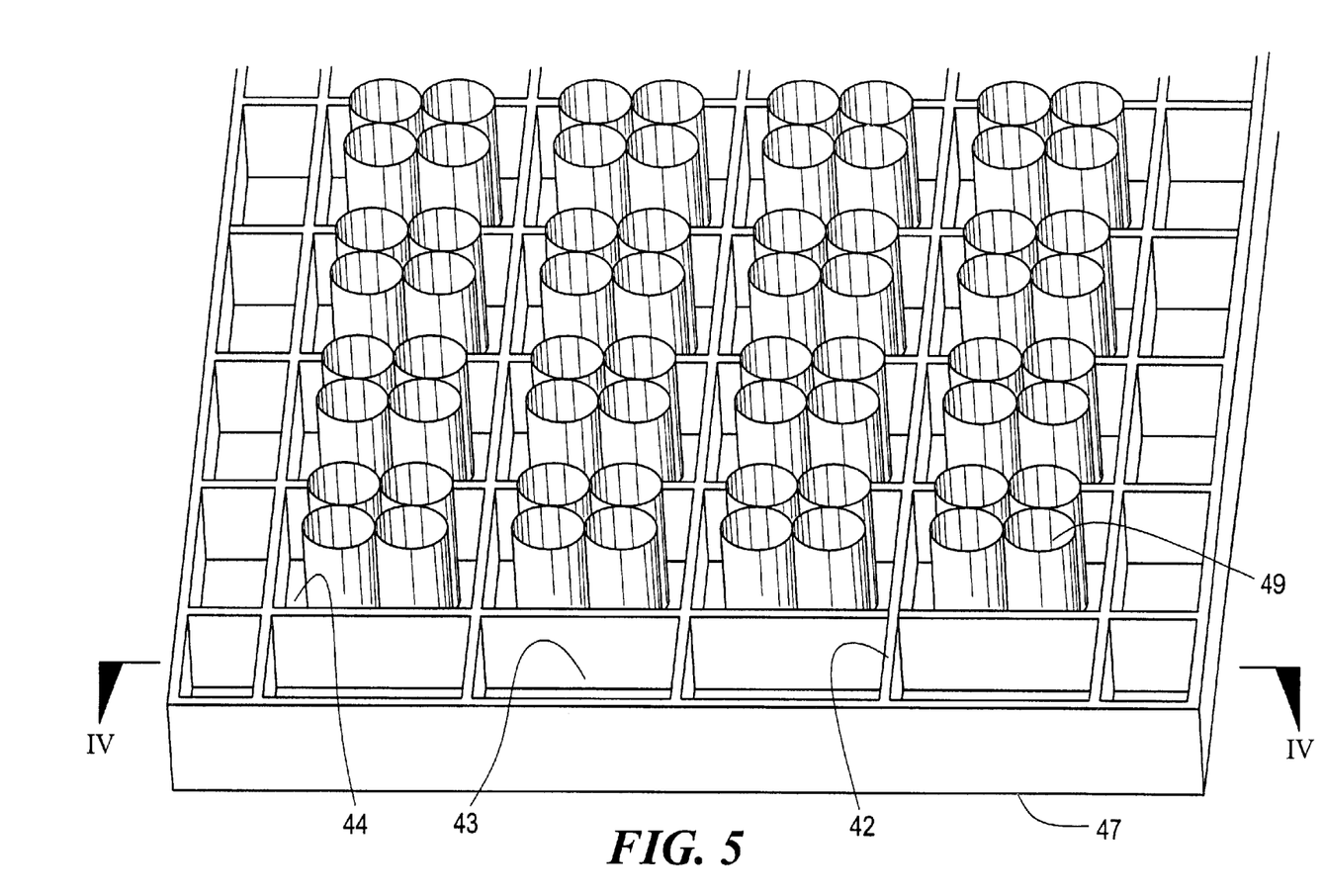
FIG. 5 is a diagram of the crumple zone of the invention.
Figure 6:
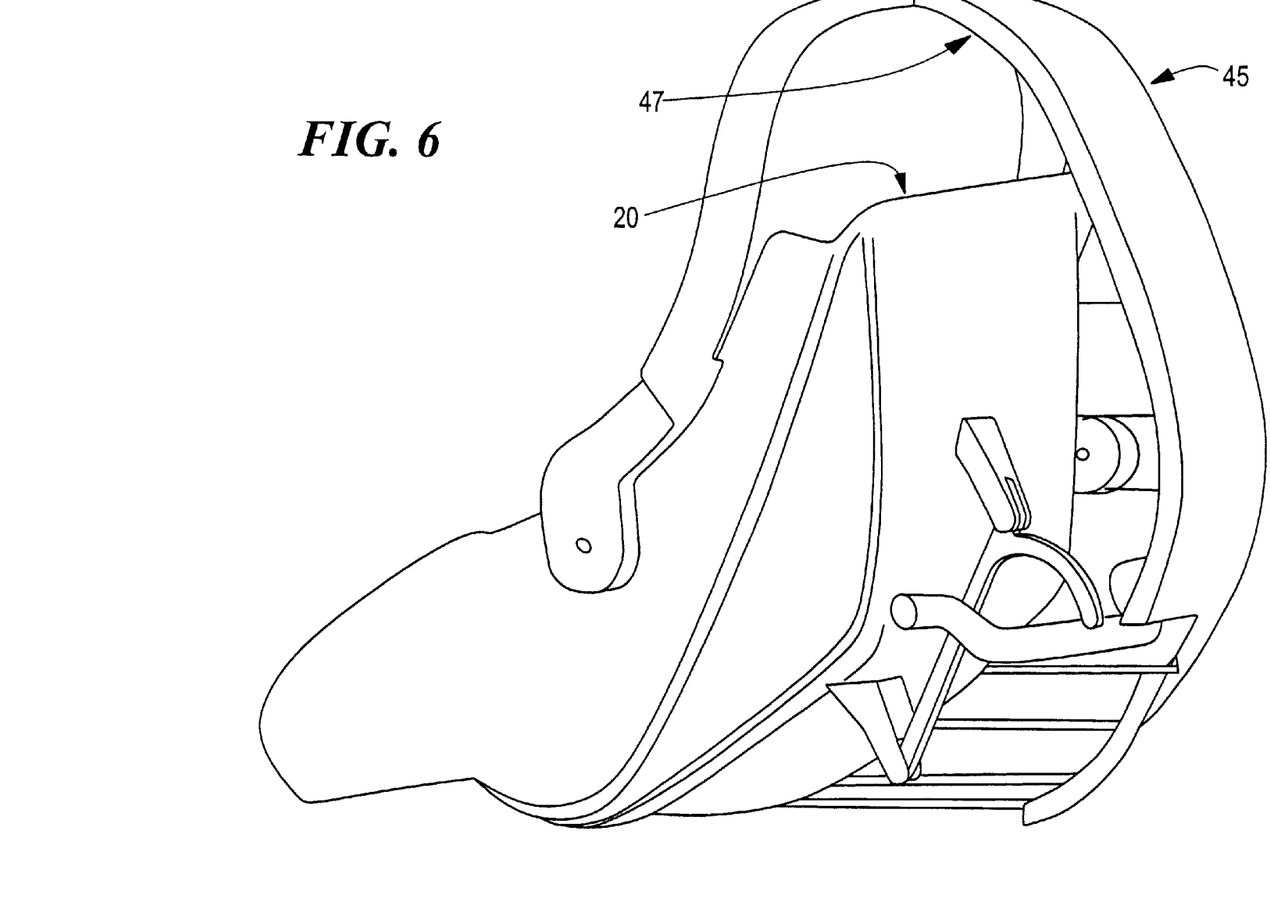
FIG. 6 is a further cutaway view of the shock absorbent barrier as incorporated in the frame.

The airbag deflector, illustrated in FIGS. 4–6, is formed as a composite panel having a compound curved back surface to deflect the air bag and absorb air bag and impact energy. The deflector includes a crumple zone construction that accomplishes the absorption. The composite panel of the deflector has an outer shell 46 and an inner shell 47. The interior region between the shells is filled with a collapsible ribbing reinforcement forming a cellular structure and a fill material, such as polystyrene. The cellular structure is preferably formed of orthogonal ribs or walls that define square or rectangular chambers and provide reinforcement. Cylindrical or hexagonal tubular members are disposed in abutting relationship within each chamber. FIG. 4 provides a cross section of the composite panel of the crumple zone. During a collision, the outer shell 46 deflects the airbag energy until the force causes the outer shell to deform and start to compress the expanded polystyrene foam fill 48. As the foam fill 48 compresses, it contacts the tubular members 49 which provide more resistance than the fill to the compression force. The force is blunted by the compression of the foam and the gradual resistance of the tubular members. In addition, orthogonal ribbing further spreads out shock waves.

FIG. 5. schematically illustrates further detail of the composite panel. The polystyrene fill has been omitted for clarity. The orthogonal walls 42 form cells 43 on the edge that have less volume than the interior cells 44 and are substantially filled only with the expanded polystyrene foam fill. The inner cells 44 support clusters of the honeycombed tubular members 49. The composite panel 45 buffers the infant away from any airbag or other impacting object such as the dashboard or a seat back. FIG. 6 illustrates how the airbag deflector 45, incorporating the crumple zone 48, is separated from the cradle providing even more buffering.

As shown in FIG. 7, during the largest motion of the frame and deflector 40 due to an impact, the deflector 40 has tensioned the seat belt 70. The seat 10 translates approximately four to five inches towards the front of the vehicle. The air bag 80 is at its maximum inflation. Further, the air bag 80 has been deflected above and over the infant 30 by air bag deflector 40 and thus air bag 80 does not come into contact with the infant 30 or infant cradle 20. In addition, the crumple zone 45 has absorbed and spread out the force of the airbag expansion protecting the child further. Any rebound from the impact will be dampened by the anti-kick bar 50 disposed at the front of the safety seat 10.

When the infant is placed in the rear seat facing rearward as illustrated in FIG. 7, the airbag deflector 40 with crumple zone 45 faces the seat back 60 of the unoccupied front passenger seat. If an impact flings the seat back 60 to the rear, the airbag deflector 40 with crumple zone 45 will absorb the force protecting the infant.

Figure 9:
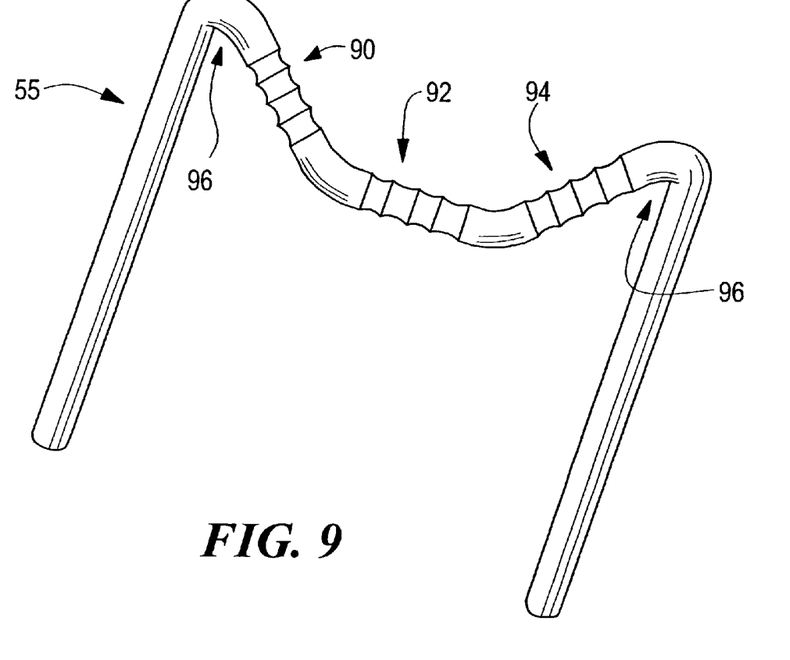
FIG. 9 is a view of a handle according to the invention.

In a further embodiment, the cradle 20 accepts a removable handle 55. This handle, as shown in FIG. 9, incorporates three gripping locations 90, 92, 94. The center grip 92 is positioned to facilitate straight lifting motions of the cradle. The right grip 94 is positioned to facilitate lifting the cradle with the right hand when the person lifting is on the left or carrying the cradle with the left hand. Similarly, the left grip 90 is positioned to facilitate lifting the cradle with the left hand when the person is on the right or carrying the cradle with the right hand.

Figure 10:
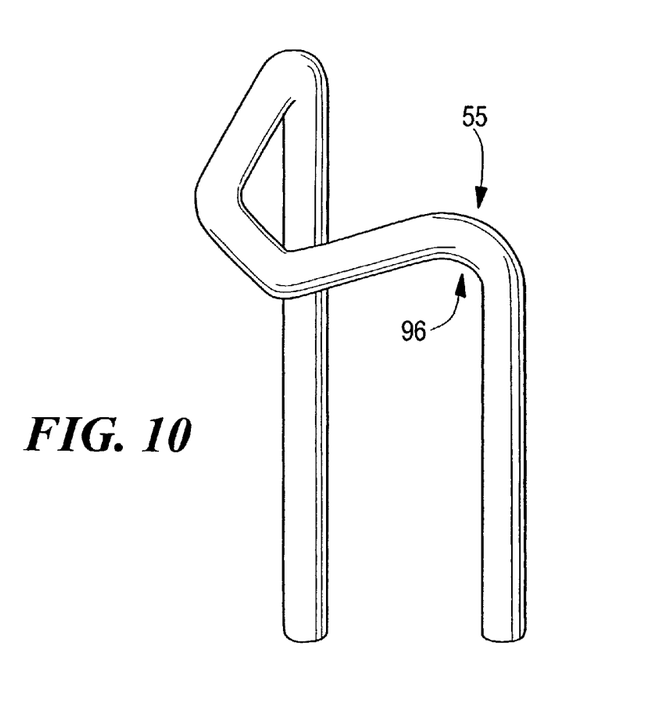
FIG. 10 is a enlarged view of the handle of FIG. 12 illustrating the elbow carrying surface.

The angle and placement of the grips allow the dead-weight forces of the infant in the cradle 20 to be ergonomically translated through the hand and arm of the adult carrying the infant and cradle. When held by the right 94 or left grip 90, the cradle naturally pivots to swing close to the carrier's body. The bend 96 in the handle 55, FIG. 10, is adapted to facilitate carrying the cradle with the handle 55 tucked into the elbow. When the handle 55 is in the vertical position, the handle 55 angles downwardly inward so that the arm can be held against the body. While one embodiment is based on the posture of the average person, the removable nature of the handle allows special handles that accommodate individual needs to be provided.

Figure 11A:
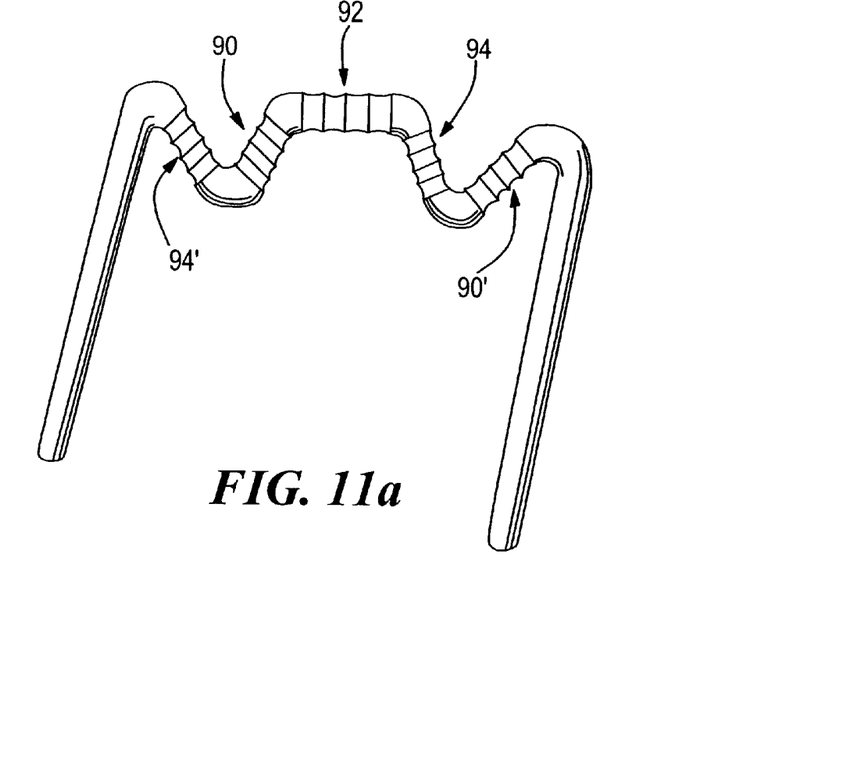
FIG. 11a is a front view of an alternate handle according to the invention.
Figure 11B:
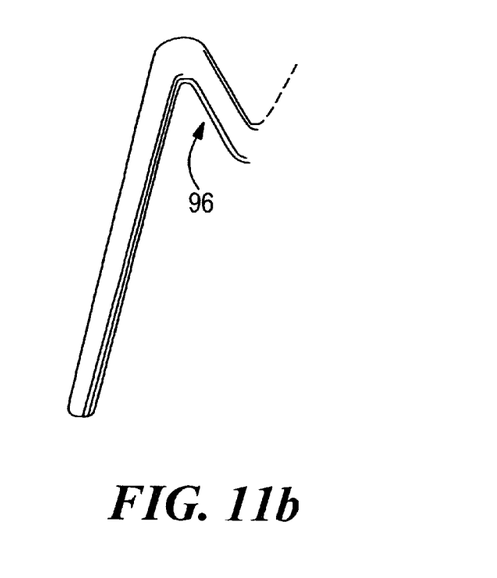
FIG. 11b is a side view of an alternate handle according to the invention.

FIG. 11*a* illustrates two alternate configurations of grips (90,92,94 or 90',92,94') on a handle that maintain the ergonomic placement. The side view, FIG. 11*b* illustrates the displacement of the gripping surfaces from the sidebar portion of the handle allowing for the natural lie of the cradle. Either embodiment can accommodate the use of an elbow in the bend of handle.

While the handle accommodates lifting the cradle with one hand, the single-handed release mechanism 32 makes it practical to use this capability in removing the cradle and infant from a car. A locking mechanism must be configured so that very little alignment is required in order to position and lock the cradle within the frame. FIG. 12 illustrates one such lock mechanism. In this lock, The cradle 20 has integral to it a set of protuberances 120 facing the frame 10. The frame is fitted with a corresponding set of locking paws 122, which in FIG. 12 are engaged, and holding the cradle 20 securely. The paws 122 have a hook end 144, a ball end 146, and a pivot point 142. Paws are interconnected in pairs by springs 148 to assure synchronized action. In order to disengage the paws, a mechanism moves the ball end 142 to the position shown in FIG. 13.

Any number of locking mechanisms may be employed for releasably securing the cradle to the frame, as long as, once the cradle is inserted within the frame, the seat is locked in place and the lock cannot be released accidentally. In conventional car seats, the release is implemented by for instance, depressing two levers, one on each side of the seat.

A duplicated single-handed release mechanism provides the convenience of being able to release the cradle from either side with one hand while providing the safety interlock and release needed to assure that the cradle does not unlock accidentally. In the child safety seat of the invention, the release mechanism is replicated on each side of the frame and either side can complete the action. To prevent accidental release of the locking mechanism, the release mechanism requires two actions to disengage the cradle from the frame.

FIGS. 12 and 13 illustrate one side of a symmetric lock and release mechanism utilized in a preferred embodiment. In FIG. 12 the mechanism is locked. In FIG. 13 the mechanism is released. To unlock the mechanism, the central button 128 of the release handle 140 is pushed in. This button is connected to the child lock shaft 130 that is concentrically mounted within the main shaft 126. Connected to the inward end of the child lock shaft 130 is a crossbar 132. The crossbar extends through the main shaft via a slit 134 in the main shaft. The crossbar 132 normally rests against lock bar 136, which prevents the main shaft 126 and the child lock shaft 130 from turning. When the child lock button 128 is pushed in, the crossbar 132 is pushed to the position in FIG. 13, displaced from the lock bar 136. Now handle 140 can be turned.

The handle, coupled 150 to the main shaft 126, turns the main shaft 126 rotating the asymmetrically mounted wing 124. As the wing 124 moves from the position shown in FIG. 12, to that in FIG. 13, the ball end 146 of the paw 122 is displaced. The paw 122 rotates around the pivot point 142 releasing the protuberances 120 on the cradle 20. The crossbar 132 and the main shaft are 126 are fitted with torsional springs 138 and not shown, so that the system returns to locking position (FIG. 12) as soon as the handle is released.

FIG. 14 illustrates an alternate push and swing release mechanism 32. With one hand, the operator pushes in on handle 110 to unlock the mechanism and then swings the pushed-in handle until it engages detent 112 to release it. Once the cradle 20 is released, it may be lifted from the frame. In one embodiment, the release handle 110 remains in the detent 112 indicating whether the cradle is locked in the frame. It will be understood that the push and swing release is illustrative of many stepped motions that can accomplish the "unlock and release" sequence.

The convertible child seat 10 can also be used in a forward facing orientation. As shown in FIG. 15, in this embodiment 10' the cradle 20 is disposed at the second end of the frame/deflector 25/40. The seat is mounted in the vehicle in a manner similar to the embodiment 10, with the difference that the occupant 30 is now forward facing. Since the child is usually larger, a larger cradle will typically be substituted for the original cradle used in the rearward facing embodiment. This larger cradle will usually not incorporate the handle since a child of this size is carried independent of the cradle. The forward facing orientation is also applicable in the rear seat as shown in FIG. 16. In both of these placements, the airbag deflector and crumple zone continue to spread and absorb the shock of an impact.

Figure 17:
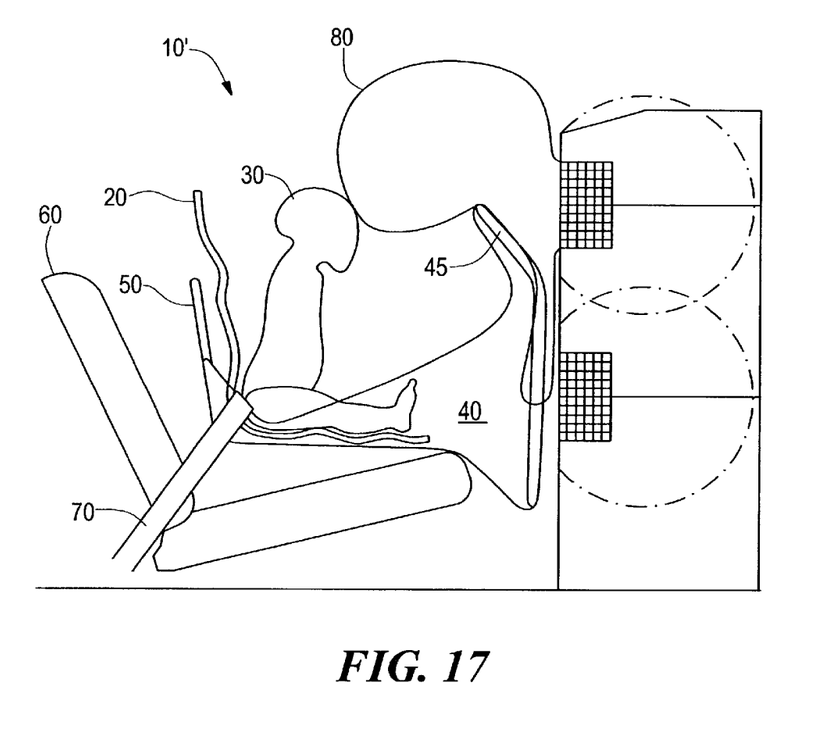
FIG. 17 is a diagrammatic side view of the child safety seat of FIG. 15 with the air bag fully inflated.

As shown in FIG. 17, at a time of maximum force on the car seat, the child 30 and seat 10' start to translate towards the front of the vehicle. The seat belt 70 is at its elastic limit and the inflating air bag 80 expands over the top of the deflector 40 and encounters the head of the infant 30 thus preventing and cushioning further forward movement of the infant 30 relative to the vehicle. The crumple zone reduces the effects of the impact by deforming as needed.

The convertible child safety seat provides protection for an occupant in either a forward facing or rearward facing orientation. The convertible child safety seat also protects the occupant from an inflating air bag when the seat is installed in the front passenger-side seat of a vehicle equipped with a passenger-side air bag and from a collapsing front seat when installed in the rear seat. The cradle is removable from the frame of the seat using a single-handed safety release mechanism. A handle, adapted to be gripped by either hand facilitates removal and carrying of the cradle.

Having described preferred embodiments of the invention it will now become apparent to those of ordinary skill in the art that other embodiments incorporating these concepts may be used. Accordingly, it is submitted that the invention should not be limited by the described embodiments but rather should only be limited by the spirit and scope of the appended claims.

We claim:

1. A convertible child safety seat comprising:
 a frame having a first end adapted to be placed at an intersect of a seatback and a seat surface, a second end, a height and a width;
 a first cradle;
 a locking mechanism removably securing said first cradle to an appendage of said frame wherein said first cradle is within said frame; and
 a shock absorbent canopy disposed at said second end of said frame, said shock absorbent canopy comprising:
  a three-dimensional surface extending substantially along the width of said cradle and extending substantially along the height of said cradle;
  a compound curve back surface for deflecting said air bag energy;
  an inner panel having a smooth inner surface and incorporating honey comb vertical tubes and orthogonal ribbing on a side facing said compound curve back surface; and
  an expanded foam fill disposed between said compound curve back surface and said inner panel, said shock absorbent canopy defining a space between said first cradle and said outermost extent of said second end of said frame, said shock absorbent canopy operative to deflect an expanding airbag over said cradle and away from direct contact between said expanding airbag and an occupant disposed within said cradle, said shock absorbent canopy operative to translate a shock pulse from said air bag energy and impact energy into a structure of said canopy decreasing the overall amplitude of a force seen by an occupant.

2. The child safety seat of claim 1 wherein said first cradle has a handle disposed between the sides of said cradle, said handle has a left side, a right side approximately parallel to and spaced apart from said left side, and a top piece disposed between said right and left sides, said top piece having a left section, a right section and a middle section, said handle comprising:
 a first grip disposed in said middle section of said handle, said middle section approximately parallel to the width of said safety seat;
 a second grip disposed on said left section of said handle, said left section angled from the side toward the middle of said safety seat;
 a third grip disposed on said right section of said handle, said right section angled from the side toward the middle of said safety seat;
 the angle formed between said respective sides and said left and right sections being between 30° and 65° and ergonomically rounded to accept a cylinder of approximately 4 to 5 inches in diameter approximately 4 inches from the vertex of said angle; and
 a mechanism allowing said handle to be removable from said first cradle.

3. The convertible child safety seat of claim 1 wherein said locking mechanism is disengaged by either of a pair of single-handed release mechanisms utilizing a two-step process, each single-handed release mechanism comprising:
 an enabling mechanism wherein, when said enabling mechanism is in a first position, said locking mechanism is unable to release from said appendage and when said enabling mechanism is in a second position, said locking mechanism can be made to release from said appendage; and
 a release mechanism to release said locking mechanism from said appendage if said enabling mechanism has first been placed in said second position;
 wherein an activation of only one of said enabling mechanism or said release mechanism does not release said locking mechanism.

4. The convertible child safety seat of claim 3 wherein said enabling mechanism is activated by a push-in movement and said release mechanism is activated by a rotational movement.

5. A convertible child safety seat comprising:
 a frame having a first end, a second end, a height and a width;
 a first cradle;
 a locking mechanism removably securing said cradle to an appendage of said frame wherein said first cradle is within said frame;
 an air bag deflector disposed at said second end of said frame, said airbag deflector comprising a surface extending substantially along said width of said cradle and extending substantially along said height of said cradle, said airbag deflector operative to deflect an expanding airbag over said cradle and away from direct contact between said expanding airbag and an occupant disposed within said cradle; and
 a pair of single-handed release mechanisms either one able to disengage said locking mechanism, each single-handed release mechanism comprising:
  an enabling mechanism wherein, when said enabling mechanism is in a first position, said locking mechanism is unable to release from said appendage and when said enabling mechanism is in a second position, said locking mechanism can be made to release from said appendage; and
  a release mechanism to release said locking mechanism, from said appendage if said enabling mechanism has first been placed in said second position; wherein an activation of only one of said enabling mechanism or said release mechanism does not release said locking mechanism.

6. The convertible child safety seat of claim 5 wherein said enabling mechanism is activated by a push-in movement and said release mechanism is activated by a rotational movement.

7. The child safety seat of claim 5 wherein said first cradle has a handle disposed between the sides of said cradle, wherein said handle has a left side, a right side approximately parallel to and spaced apart from said left side, and a top piece disposed between said right and left sides, said top piece having a left section, a right section and a middle section, said handle comprising:
- a first grip disposed in said middle section of said handle, said middle section approximately parallel to the width of said safety seat;
- a second grip disposed on said left section of said handle, said left section from the side toward the middle of said safety seat;
- a third grip disposed on said right section of said handle, said right section angled from the side toward the middle of said safety seat;
- the angle formed between said respective sides and sections, being between X° and Y° and ergonomically rounded to accept a cylinder of approximately 4 to 5 inches in diameter; and
- a mechanism allowing said handle to be removable from said first cradle.

8. The convertible safety seat of claim 7 wherein the width of said air bag deflector is greater than a width of said cradle.

9. The convertible safety seat of claim 5 wherein said first cradle is utilized with an opening in either a facing away from said shock absorbent canopy orientation or a facing the shock absorbent canopy orientation; said convertible safety seat further comprising a second cradle substituted for said first cradle, wherein said second cradle is used in said facing the shock absorbent canopy orientation.

10. The convertible child seat of claim 9 wherein said first cradle is adapted to accommodate a smaller child-and said second cradle is larger than said first cradle.

11. The convertible child safety seat of claim 5 wherein said airbag deflector further comprises:
- a shock absorbent canopy defining a space between said first cradle and an outermost extent of said second end of said frame, said shock absorbent canopy operative to translate a shock pulse from said air bag energy and an impact energy into a structure of said canopy, decreasing the overall amplitude of a force seen by said occupant.

12. The convertible child safety seat of claim 11 wherein said shock absorbent canopy comprises:
- a compound curve back surface for deflecting said air bag energy;
- an inner panel having a smooth inner surface and incorporating honey comb vertical tubes and orthogonal ribbing on a side facing said compound curve back surface; and
- an expanded foam fill disposed between said compound curve back surface and said inner panel.

13. A convertible child safety seat comprising:
- a frame having a first end, a second end, a height and a width;
- a shock absorbent canopy deflector disposed at the second end of said frame, extending substantially along the width of said frame and extending substantially along the height of said frame, defining a space between a cradle and an outermost extent of said second end of said frame, said shock absorbent canopy comprising:
  - a compound curve back surface for deflecting said air bag energy;
  - an inner panel having a smooth inner surface and incorporating honey comb vertical tubes and orthogonal ribbing on a side facing said compound curve back surface; and
  - an expanded foam fill disposed between said compound curve back surface and said inner panel, said shock absorbent canopy operative to deflect an expanding airbag over said cradle and away from direct contact between said expanding airbag and said occupant disposed within said cradle and operative to translate a shock pulse from said air bag energy and an impact energy into a structure of said canopy, decreasing the overall amplitude of a force seen by an occupant;
- a first cradle having a handle, wherein said first cradle is utilized with an opening either facing away from said shock absorbent canopy and facing said shock absorbent canopy;
- a locking mechanism removably securing said cradle to an appendage of said frame wherein said first cradle is within said frame; and
- a second cradle, operative to be substituted for said first cradle, wherein said second cradle is used oriented facing said shock absorbent canopy, wherein said first cradle is adapted to accommodate a smaller child and said second cradle is larger than said first cradle.

14. The child safety seat of claim 13 wherein said handle has a left side, a right side approximately parallel to and spaced apart from said left side, and a top piece disposed between said right and left sides, said top piece having a left section, a right section and a middle section, said handle comprising:
- a first grip disposed in said middle section of said handle, said middle section approximately parallel to the width of said safety seat;
- a second grip disposed on said left section of said handle, said left section angled from the side toward the middle of said safety seat;
- a third grip disposed on said right section of said handle, said right section angled from the side toward the middle of said safety seat;
- the angle formed between said respective sides and said left and right sections being between 30° and 65° and ergonomically rounded to accept a cylinder of approximately 4 to 5 inches in diameter approximately 4 inches from the vertex of said angle; and
- a mechanism allowing said handle to be removable from said first cradle.

15. The convertible child safety seat of claim 13 wherein said looking mechanism is disengaged by either of a pair of single-handed release mechanisms utilizing a two-step process, each single-handed release mechanism comprising:
- an enabling mechanism wherein, when said enabling mechanism is in a first position, said locking mechanism is unable to release from said appendage and when said enabling mechanism is in a second position, said locking mechanism can be made to release from said appendage; and
- a release mechanism to release said locking mechanism from said appendage if said enabling mechanism has first been placed in said second position;
- wherein an activation of only one of said enabling mechanism or said release mechanism does not release said locking mechanism.

16. The convertible child safety seat of claim 15 wherein said enabling mechanism is activated by a push-in movement and said release mechanical is activated by a rotational movement.

* * * * *

UNITED STATES PATENT AND TRADEMARK OFFICE
CERTIFICATE OF CORRECTION

PATENT NO. : 6,386,632 B1
DATED : May 14, 2002
INVENTOR(S) : Dan Goor et al.

Page 1 of 1

It is certified that error appears in the above-identified patent and that said Letters Patent is hereby corrected as shown below:

<u>Column 3,</u>
Line 15, "rare seat" should read -- rear seat --;

<u>Column 10,</u>
Line 48, "looking" should read -- locking --; and
Line 65, "mechanical" should read -- mechanism --.

Signed and Sealed this

Twenty-second Day of July, 2003

JAMES E. ROGAN
*Director of the United States Patent and Trademark Office*